United States Patent Office 3,649,676
Patented Mar. 14, 1972

3,649,676
PROCESS FOR THE MANUFACTURE OF
UNSATURATED ALCOHOL-ESTERS
André Marc Galfré, Plan-de-Grasse, Marcel Plattier,
Antibes, and Paul José Teisseire, Grasse, France, assignors to S.A. des Etablissements Roure-Bertrand Fils
& Justin Dupont, Grasse, France
No Drawing. Continuation-in-part of application Ser. No.
625,014, Mar. 22, 1967. This application Sept. 12, 1969,
Ser. No. 857,540
Claims priority, application Switzerland, Mar. 30, 1966,
4,752/66
Int. Cl. C07c 67/00
U.S. Cl. 260—491                           6 Claims

ABSTRACT OF THE DISCLOSURE

Unsaturated alcohol-esters of the formula

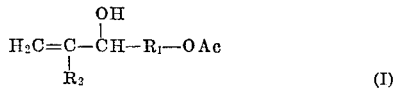

(I)

wherein $R_1$ represents a divalent hydrocarbon group, $R_2$ represents a hydrogen atom or a lower alkyl group and Ac represents an acyl radical of a carboxylic acyl group, are prepared, without substantial cleavage of the ester group, by isomerising an epoxide of the general formula

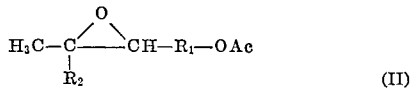

(II)

using a triloweralkyl aluminium compound as catalyst to effect the isomerisation. Epoxy-citronellyl acetate obtainable by said isomerisation reaction is converted into the tetrahydropyran known as "rose-oxide" which latter is a valuable odoriferous material.

---

The present application is a continuation-in-part of application Ser. No. 625,014, filed Mar. 22, 1967, now abandoned.

THE PRIOR ART

British Pat. No. 877,138 (published Sept. 13, 1961) discloses a process for isomerizing epoxides, which contain on the carbon atom adjacent to the epoxy group at least one hydrogen atom, to yield α,β-unsaturated alcohols using an organo-aluminium compound as catalyst. The use of di-isobutyl aluminium hydride is described in detail in connection with a two-stage process which involves subsequent hydrolysis of an organo-aluminium compound formed as an intermediate during said isomerization. The said British patent also makes general reference to the use, as catalysts, of other organo-aluminium compounds, namely, aluminium triethyl and diethyl aluminium hydride. Said patent appears to stem from the work of Kirchhof reported in Chemische Berichte 93, 2712 (1960).

BRIEF SUMMARY OF THE INVENTION

The instant invention relates to a process for the manufacture of unsaturated alcohol-esters of the formula

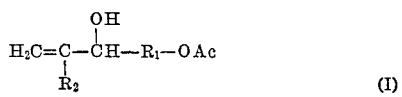

(I)

wherein $R_1$ represents a divalent hydrocarbon group having up to 18 carbon atoms, $R_2$ represents a hydrogen atom or a lower alkyl group having up to 6 carbon atoms, and Ac represents an acyl radical of a carboxylic acyl group having up to 7 carbon atoms, which comprises treating an epoxide of the formula

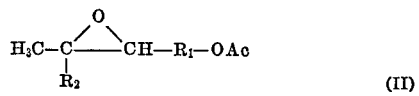

(II)

wherein $R_1$, $R_2$ and Ac have the meanings given above, with a triloweralkyl aluminium compound.

It has been found, surprisingly, in accordance with the present invention, that, when one starts with an epoxide represented by Formula II which contains an ester grouping, such ester grouping remains substantially intact if the isomerization reaction is carried out using a trilower alkyl aluminium compound. This was wholly unexpected since, if dialkyl aluminium compounds, exemplified by diisobutyl aluminium hydride, or lithium aluminium hydride, are utilized, cleavage of the ester groups of the aforesaid epoxides occurs, and it would have been expected that similar cleavage would occur using triloweralkyl aluminium compounds. However, as stated, it has been found in accordance with the present invention that such cleavage of the ester groups does not substantially occur.

DETAILED DESCRIPTION OF THE INVENTION

The instant invention relates to a process for the production of unsaturated aliphatic alcohol-esters of the formula

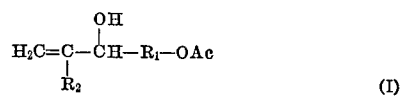

(I)

wherein $R_1$ represents a divalent aliphatic hydrocarbon group which may be linear, branched, saturated or unsaturated, $R_2$ represents a hydrogen atom or a lower alkyl group and Ac represents an acyl radical of a carboxylic acyl group having up to 7 carbon atoms, which comprises treating an epoxide of the formula

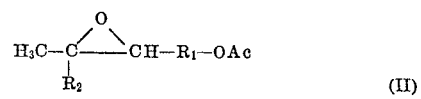

(II)

wherein $R_1$, $R_2$ and Ac have the above defined meanings, with a triloweralkyl aluminium compound, and hydrolysing the resulting aluminium alcoholate.

The hydrocarbon group $R_1$ may for example be a grouping such as alkyl, alkenyl or alkynyl, for example those containing up to 18 carbon atoms [such as methyl, ethyl, isopropyl, n-butyl, isobutyl, tertiary butyl, pentyl, 3-methylpentyl, hexyl, octyl, decyl, dodecyl, tetradecyl, hexadecyl and octadecyl and corresponding radicals with one or more unsaturated bonds (ethylenically or acetylenically), such as for example 3-methyl-4-pentyl] and cycloaliphatic hydrocarbon radicals, such as cycloalkyl- or cycloalkenyl radicals, for example those containing from 5 to 7 carbon atoms. Equivalent to the foresaid aliphatic groupings are the aromatic hydrocarbon radicals, particularly phenyl.

The group $R_2$, when a lower alkylene group, may be straight chain or branched and conveniently contains up to 6 carbon atoms e.g. methyl, ethyl, propyl, isopropyl, n-butyl, isobutyl, tertiary butyl, 3-methylpentyl and hexyl.

The acyl radical Ac, which contains up to 7 carbon atoms, is preferably derived from an aliphatic or mononuclear aromatic carboxylic acid, in particular a lower alkane carboxylic acid, for example from formic acid, acetic acid, propionic acid, butyric acid or benzoic acid.

The alkyl radicals of the triloweralkyl aluminium compound are preferably groups containing up to 6 carbon atoms each. Examples of alkyl radicals of this kind include methyl, propyl, isopropyl, n-butyl, isobutyl, 3-methylpentyl and hexyl. A special preference is expressed for the compound triisobutyl aluminium.

A starting material of Formula II of particular importance according to this invention is the epoxide of citronellyl acetate, because the 2,6-dimethyl-3-hydroxy-8-acetoxy-1-octene (IV), which can be obtained from it in accordance with the invention, is particularly suitable for conversion into the valuable odoriferous substance (VII), [rose oxide: 2-(2-methyl-1-propenyl)-4-methyl-tetrahydropyran].

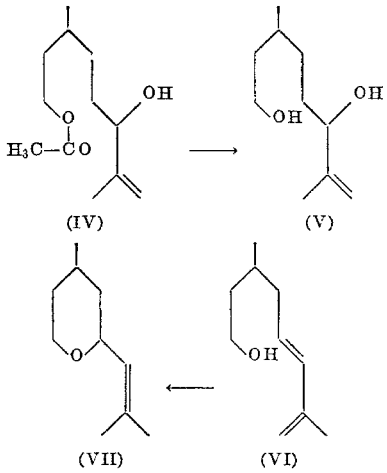

Conversion can be carried out in accordance with the above reaction diagram by hydrolysing the monoester IV to form the glycol V, dehydrating the glycol and cyclising the product of dehydration VI to form the tetrahydropyran compound VII, which can be done for example by distillation under reduced pressure in an acidic medium, preferably in the presence of phosphoric acid (for example 85%). The conversion of the monoester IV to the dehydration product VI may be effected for example by means of phosphorous oxytrichloride in hexametapol (hexamethyl phosphorous triamide).

The epoxides of Formula II used as starting materials, apart from those which are already known, can be obtained according to conventional and well known methods from the corresponding ethylenically unsaturated compounds, for example with peracids.

Treatment of the starting materials of Formula II with the triloweralkyl aluminium compound is preferably carried out in the presence of a solvent. Suitable solvents include for example saturated aliphatic hydrocarbons, such as hexane or petroleum ether, aromatic hydrocarbons such as benzene, toluene, xylene; halogenated hydrocarbons such as methylene chloride, chlorobenzene; ethers such as diethyl ether or dibutyl ether. Generally speaking, the temperature at which the reaction is carried out is not critical. The most favourable temperature ranges may be readily determined by preliminary tests. In general, temperatures in the range from approximately 0° C. to the boiling point of the reaction mixture may be used, temperatures in the range from 20 to 80° C. being preferred.

The triloweralkyl aluminium compound may be used either as such or in the form of an addition complex. The following are examples of suitable complex formers: amines and, in particular, tertiary amines such as pyridine, morpholine; mono-, di- or trialkylamines, for example triethylamine; ethers such as dialkyl ethers, for example diethyl ether, or cyclic ethers, for example tetrahydrofuran. Addition complexes of this kind may be prepared in known manner.

Approximately 1 to 1.2 mols of the triloweralkyl aluminium compound are preferably used per mol of the epoxide of Formula II.

According to a preferred embodiment of the process according to the invention, a solution of the triloweralkyl aluminium compound is added to a solution of the epoxide II. In this way, a particularly uniform reaction is obtained, leading to the required unsaturated alcohol-esters I.

The resulting alcohol-esters of Formula I may be readily identified by their infra-red spectrum which is distinguished by the following characteristic bands:

3300–3400 cm.$^{-1}$: $\nu$—OH
3070 cm.$^{-1}$: $\nu$—CH in C=CH$_2$
1650 cm.$^{-1}$: $\nu$—C—D
895 cm.$^{-1}$: $\nu$—CH in C=CH$_2$
1790 cm.$^{-1}$: overtone of the previous oscillation The products of Formula I may be used for example as intermediate products in the preparation of odoriferous compounds.

In the following examples which illustrate the invention the temperatures are given in degrees centigrade (° C.).

Example 1

Into a vented, ice-cooled, 6 liter flask fitted with a stirrer, a dropping funnel and a heating sheath, were put a solution of 2.2 moles of monoperphthalic acid in 4500 ml. of diethyl ether. This solution was cooled to temperature of about 0°. 297 g. of citronellyl-acetate were then added over a period of 1 hour, during which time the temperature was maintained at about 0°. The resulting solution was then allowed to react for four hours at a temperature of about 0° and was subsequently allowed to stand at room temperature (20°) for a further 24 hours. The phthalic acid which formed during the reaction was filtered off and washed with diethyl ether. The ethereal solution was then washed with sodium sulfite to remove the excess of monoperphthalic acid, then with sodium bicarbonate and water until the ethereal solution was neutral. The neutral ethereal solution was then distilled to remove the solvent leaving a crude product. On distillation of this crude product there was obtained 270 g. of epoxy-citronellyl acetate (yield=85%), having the following characteristics: boiling point 112–113°/5 mm., $n_D^{15}$=1.4370; $\alpha_D$=+2°.

Example 2

Into a 5 litre flask fitted with a stirrer, a dropping funnel, a heating sheath and a reflux condenser were introduced 214 g. of epoxy-citronellyl acetate (obtained as described in Example 1) dissolved in 100 ml. of anhydrous benzene. The apparatus was swept with nitrogen and then maintained under a nitrogen atmosphere. 237.6 g. of triisobutylaluminium were then introduced into the flask over a period of 1 hour. The mixture was allowed to react for 1 hour after the addition was completed. Excess triisobutylaluminium was then destroyed by adding 100 ml. of ethanol and hydrolysing the resulting aluminium alcoholate with 2 litres of 10% sulphuric acid. Separation of the desired product according to conventional procedures provided 185 g. of 2,6-dimethyl-3-hydroxy-oct-1-en-8-ol acetate (yield 86%) having the following characteristics: boiling point 117–118°/1 mm.; infra-red spectrum showed bands at 3300–3400 cm.$^{-1}$, 3070 cm.$^{-1}$, 1650 cm.$^{-1}$, 895 cm.$^{-1}$ and 1790 cm.$^{-1}$.

Example 3

(a) In a 500 ml. flask were placed 36 g. of phosphorous oxytrichloride at a temperature of 20°. 124 ml. of hexamethyl phosphorous triamide were then added, over a period of 30 minutes, during which time the temperature rose to 45°. 42.8 g. 2,6-dimethyl-3-hydroxy-oct-1-en-8-ol acetate were then introduced. Over a period of 15 minutes the temperature was raised to 150° and the temperature was maintained at this value for 4 hours. The resulting mixture was poured into 400 ml. of ice cold water. Isolation of the crude product gave 32.2 g. of crude 2,6-dimethyl-octa-1,3-diene-8-ol acetate (yield=90%).

(b) The crude 2,6-dimethyl-octa-1,3-diene-8-ol acetate, obtained as above, was saponified, without purification, under reflux for 1 hour with a solution of 20 g. of 85% potassium hydroxide in 150 ml. of 80% ethanol. Isolation of the product provided 24.6 g. of crude 2,6-dimethyl-octa-1,3-diene-8-ol (yield=80% with respect to the product of part (a) of this example) having the following characteristics: boiling point 107–108°; $n_D^{15}$=1.4710; $\alpha_D$=+3.50°; infra-red spectrum showed bands at 3295, 3074, 1785, 1651 and 898 cm$^{-1}$.

(c) Into a 100 ml. Vigreux flask fitted with a capillary tube, a heating sheath, a thermometer at the top of the column and a cooling separator, were placed 2 g. of 85% phosphoric acid and 26.2 g. of 2,6-dimethyl-octa-1,3-diene-8-ol (obtained as in part (b) of this example). The pressure was reduced to 20 mm., and the reaction mass was gradually heated to 250°. The distillate was eliminated as it was formed (boiling point 80–85°). The distillate obtained was taken up in 50 ml. of petroleum ether, washed to neutrality and rectified. There was obtained 15 g. of isomers of 2-(2-methyl-1-propenyl)-4-methyl-tetrahydropyran. (Yield=about 50% with respect to the product of part (a) of this example.) The product had a boiling point of 83–87° and an $\alpha_D$=+32°. Chromatographic analysis of the product showed the presence of two principal peaks and two minor peaks. The two principal peaks corespond to the cis- and trans-isomers of 2-(2-methyl-1-propenyl)-4-tetrahydropyran. The two minor peaks correspond to the two methylenic isomers (cis and trans). Over a Reoplex 100 column with celite (30%) and at a temperature of 130°, the apparent retention volumes with respect to linalool of the four isomers were: 0.612, 0.658, 0.436 and 0.490.

What is claimed is:
1. Process for the manufacture of unsaturated alcoholesters of the formula

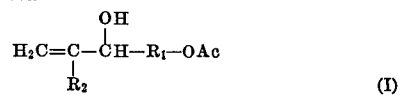
(I)

wherein $R_1$ represents a divalent hydrocarbon group having up to 18 carbon atoms, $R_2$ represents a hydrogen atom or a lower alkyl group having up to 6 carbon atoms, and Ac represents a lower alkanoyl group having up to 7 carbon atoms which comprises treating an epoxide of the formula

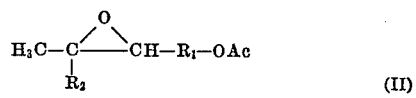
(II)

wherein $R_1$, $R_2$ and Ac have the meanings given above, with a triloweralkyl aluminium compound at a temperature of from 0° C. to the boiling point of the reaction mixture and hydrolysing the resulting aluminium alcoholate.

2. Process according to claim 1 wherein $R_1$ represents an alkylene group.

3. Process according to claim 2 wherein $R_1$ represents a 3-methyl-pentamethylene group.

4. Process according to claim 2 wherein Ac represents an acetyl group.

5. Process according to claim 1 wherein the triloweralkyl aluminium compound is triisobutyl aluminium.

6. Process according to claim 1 wherein $R_2$ represents a methyl group.

References Cited
FOREIGN PATENTS
877,138   9/1961   Great Britain _____ 260—632

LORRAINE A. WEINBERGER, Primary Examiner

V. GARNER, Assistant Examiner

U.S. Cl. X.R.

260—345.1, 348 A, 476 R, 479 R, 489, 515 P, 631.5